June 25, 1940.　　　　G. L. McCAIN　　　　2,205,486
POWER DRIVING MECHANISM
Filed Jan. 18, 1934　　　4 Sheets-Sheet 1

INVENTOR.
George L. McCain.
BY
Harness, Lind, Patee & Harris
ATTORNEYS.

June 25, 1940.   G. L. McCAIN   2,205,486
POWER DRIVING MECHANISM
Filed Jan. 18, 1934   4 Sheets-Sheet 2
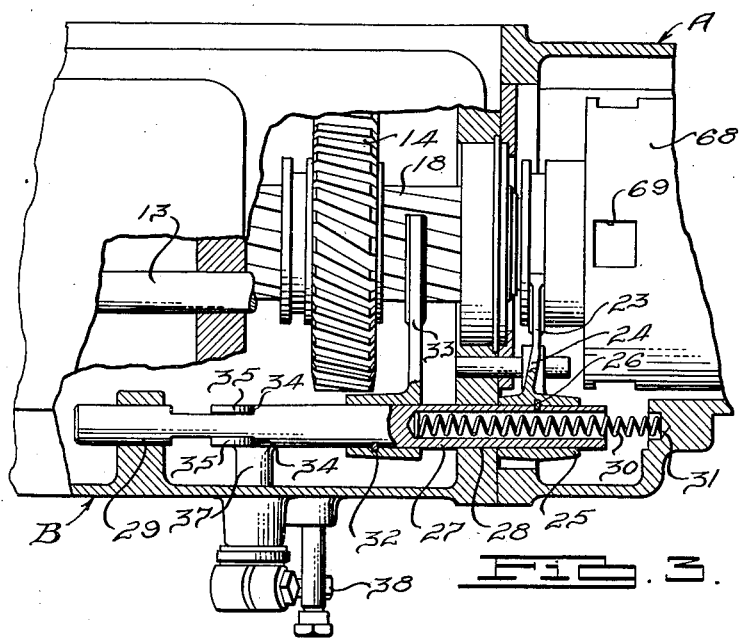
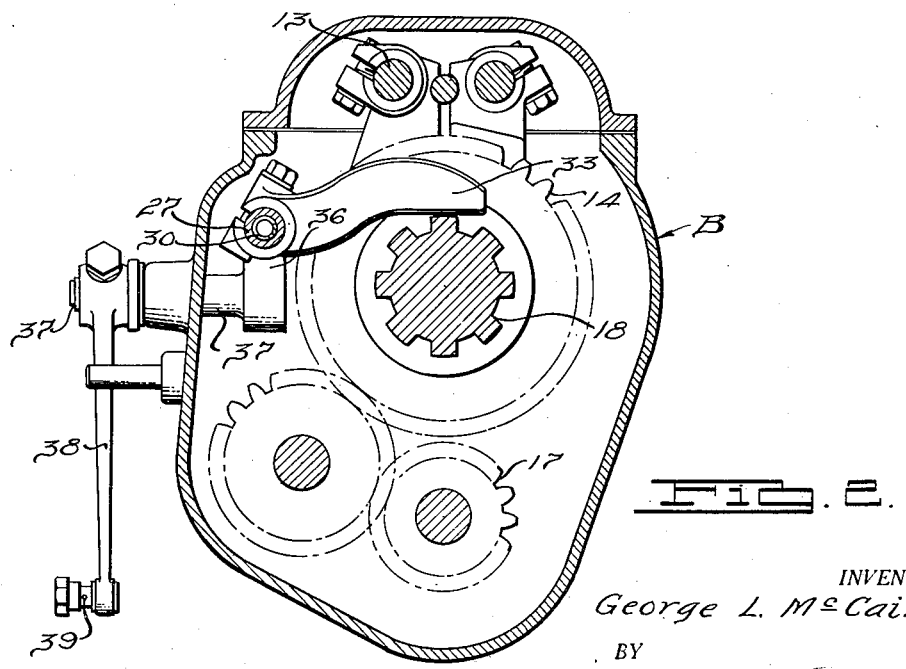
INVENTOR.
George L. McCain,
BY
Harness, Dind, Patee & Harris,
ATTORNEYS.

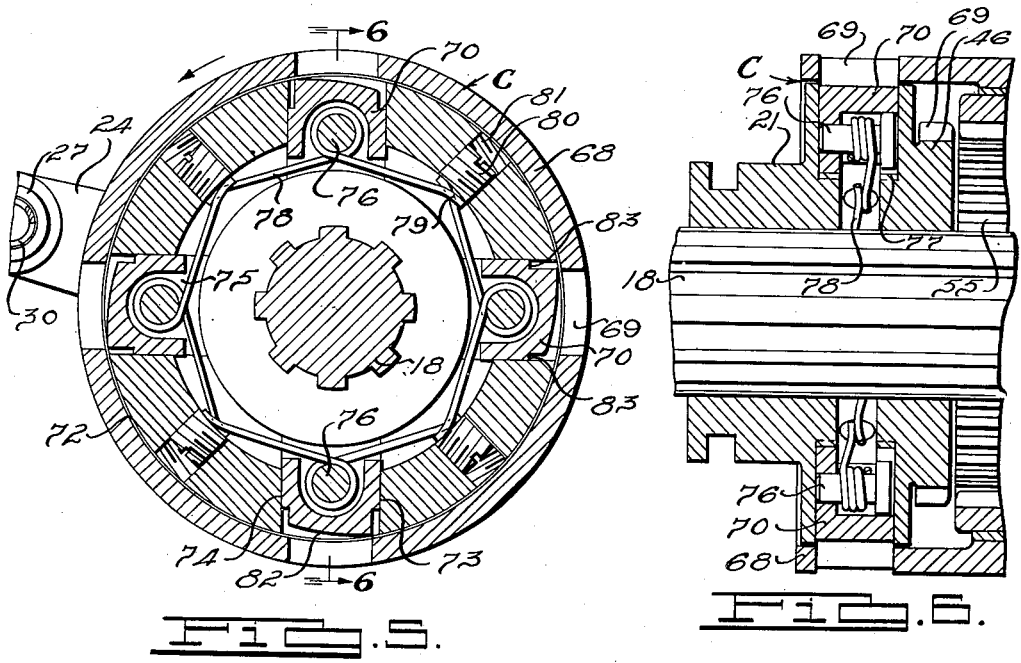
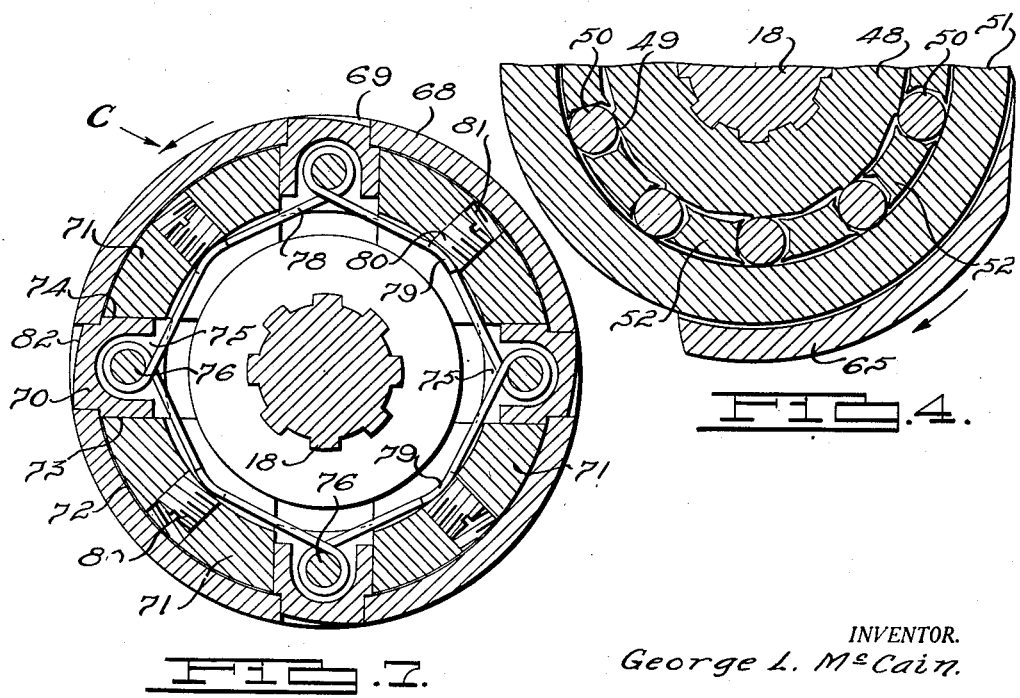

June 25, 1940.　　　　　G. L. McCAIN　　　　　2,205,486
POWER DRIVING MECHANISM
Filed Jan. 18, 1934　　　　4 Sheets-Sheet 4
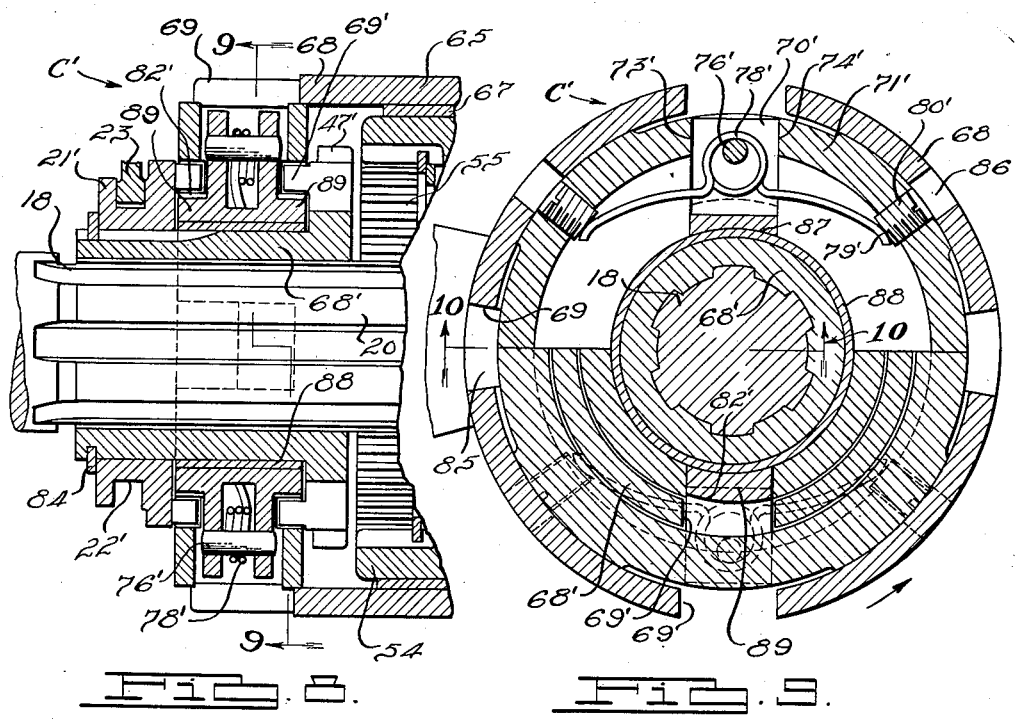
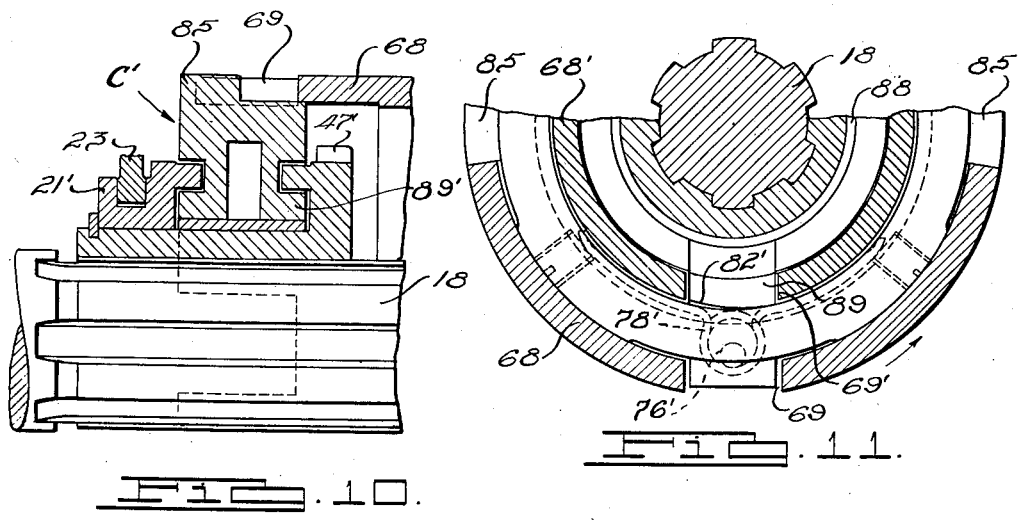
INVENTOR.
George L. McCain.
BY
Harness, Lind, Patee & Harris,
ATTORNEYS.

Patented June 25, 1940

2,205,486

UNITED STATES PATENT OFFICE 2,205,486

POWER DRIVING MECHANISM

George L. McCain, Detroit, Mich., assignor to Chrysler Corporation, Detroit, Mich., a corporation of Delaware Application January 18, 1934, Serial No. 707,076

57 Claims. (Cl. 74—336)

This invention relates to driving mechanisms and refers more particularly, in one embodiment thereof, to improvements in power driving mechanisms for motor cars or vehicles, especially where it is desired to vary the driving speed ratio between the vehicle engine or prime mover and the propelling ground wheels.

One object of my invention resides in the provision of a driving mechanism adapted, under predetermined desired conditions, to automatically effect the drive for the vehicle. My driving mechanism is preferably adapted for use in connection with a speed ratio changing transmission of any desired type and is adapted to establish an auxiliary driving speed ratio for the vehicle, such as an overdrive ratio for example.

A further object of my invention resides in the provision of an overdriving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and, on falling below this critical speed, the overdrive becomes ineffective.

In carrying out the aforesaid objects of my invention, I have provided an auxiliary driving mechanism which, where an overdrive speed ratio is desired for the vehicle, is driven from the vehicle so as to be responsive in its actuation. This auxiliary or overdrive mechanism is driven, when inoperative as a drive, at a speed less than that of a shaft or other part cooperating therewith and driven from the engine. Ordinarily, I prefer to arrange my auxiliary driving mechanism between driving and driven shafts or other parts respectively responsive in their actuation to the speeds of the engine and vehicle traveling speed, the auxiliary driving mechanism being thus driven, when inoperative, from the driven shaft and at a speed less than that of the driving shaft by the amount or ratio of overdrive desired.

In order to effect the aforesaid automatic engagement and disengagement of the drive through the auxiliary driving mechanism, I have provided a clutch which will automatically connect and release the clutch controlled parts of the auxiliary drive under predetermined desired conditions of relative speeds of the engine and vehicle or driving and driven shafts. This automatic clutch is preferably of the type having a cage or core carrying one or more pawls or dogs responsive to centrifugal force at the desired critical speed for movement of the pawls into clutching relationship with a co-operating or companion clutch member or shell formed with suitable pawl engaging slots or openings, the pawl carrying cage being driven with either the engine driving shaft or the vehicle driven shaft and the slot carrying shell being driven with the other of these shafts. If desired, other types of clutches may be used to control the auxiliary driving mechanism within the broader aspects of my invention.

A further object of my invention resides in the provision of what may be termed primary driving means in addition to said auxiliary driving mechanism for driving the vehicle independently thereof, such means preferably being under manual control so that the drive may be established independently of the auxiliary drive and automatic clutch associated therewith. The primary driving means may thus provide the normal driving medium between the engine and vehicle drive either throughout the entire speed range of the vehicle or up to the aforesaid critical speed at which time the automatic clutch transfers the drive to and through the said auxiliary driving mechanism.

A still further object of my invention resides in the provision of an overrunning or free wheeling clutch as a part of the aforesaid primary driving means. With such novel arrangement, the vehicle may overdrive the engine, the auxiliary and primary drives and parts associated therewith being arranged so that when engagement of the automatic clutch takes place to drive the vehicle through the auxiliary driving mechanism, the overrunning clutch is preferably rendered simultaneously ineffective, the overrunning clutch and primary driving means being automatically effective when the automatic clutch releases its drive, as when the vehicle speed drops below the predetermined desired critical speed.

An additional object of my invention resides in the provision of means for manually rendering the aforesaid overrunning clutch ineffective either throughout the vehicle speed range or above or below the critical speed at which operation of the automatic clutch takes place.

Another object of my invention resides in the provision of means responsive to manually controlled manipulation of the said speed ratio changing transmission into the transmission setting for reversing the normal direction of vehicle drive, for automatically locking out or rendering ineffective the said overrunning clutch, this means being preferably in addition to the aforesaid manually controlled means for the overrunning clutch or automatic clutch or both as may be desired in any particular installation.

Further objects of my invention in the more limited aspects thereof reside in the provision of an improved overdriving mechanism employing internal relatively quiet gearing; the provision of an efficient power transmission mechanism having its component part compactly arranged for manufacture and assembly at relatively low cost; and in the novel combination and arrangement of parts more particularly hereinafter described and shown in several detailed embodiments in order to illustrate the principles of my invention, reference being had to the accompanying drawings, in which, Fig. 1 is a sectional elevational view through my power transmission mechanism.

Fig. 2 is a sectional elevational view showing the reverse gearing of the speed ratio changing transmission illustrated with my invention, the section being taken along the staggered line 2—2 of Fig. 1.

Fig. 3 is a plan view of the transmission as shown in Fig. 1, the casing being broken away to illustrate the reverse gearing and associated mechanism.

Fig. 4 is a sectional elevational view through a portion of the overrunning or free wheeling clutch, the section being taken along the line 4—4 of Fig. 1.

Fig. 5 is a sectional view through the automatic clutch looking forwardly, the section being taken along the line 5—5 of Fig. 1.

Fig. 6 is a sectional elevational view through the automatic clutch shown in Fig. 5, the section being taken along the line 6—6 of Fig. 5.

Fig. 7 is a view corresponding to Fig. 5 illustrating the engaged or operating position of the clutch parts.

Fig. 8 is a sectional elevational view illustrating a modified form of automatic clutch, the view corresponding generally to Fig. 6 but showing a reversal of the driving arrangement for the clutch parts.

Fig. 9 is a sectional elevational view through line 9—9 of the clutch shown in Fig. 8.

Fig. 10 is a sectional bottom plan view of a portion of the clutch shown in Fig. 9, the section being taken along line 10—10 thereof.

Fig. 11 is a fragmentary view of the lower portion of the clutch shown in Fig. 8 illustrating the engaged or operating position of the clutch parts.

Figure 1:
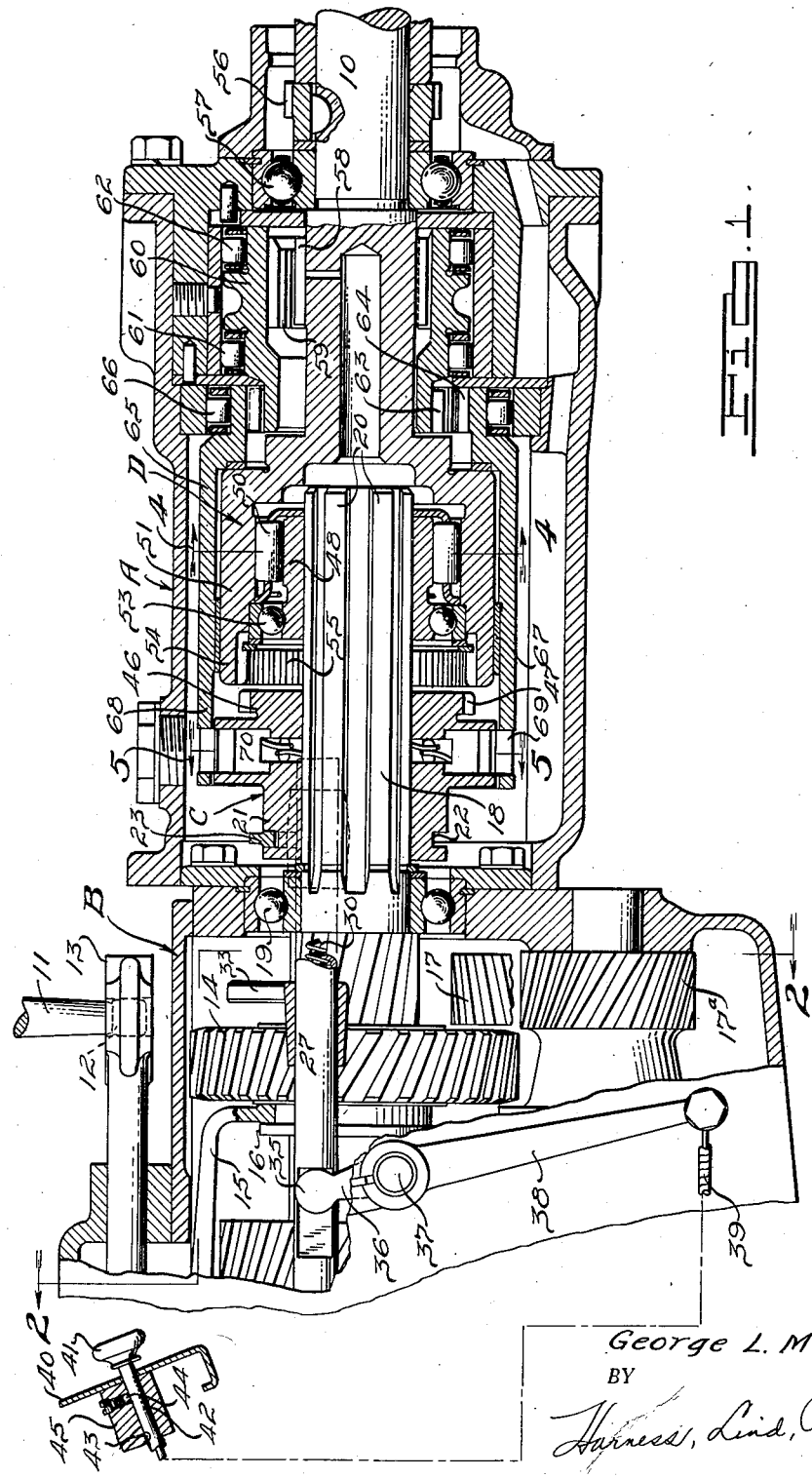

In the drawings I have illustrated my driving mechanism A interposed between speed ratio changing transmission B and the driven shaft 10, the latter extending rearwardly to drive the rear wheels of the motor car or vehicle in the usual well-known manner, it being understood that I have elected to show my invention in association with a motor vehicle drive, although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated by the well-known shifter lever 11, the lower end 12 of which is illustrated in Fig. 1 as engaging the usual selector controls 13 whereby the various adjustments may be made to the transmission in order to provide the speed ratios in the line of drive through the transmission. Inasmuch as transmission B may be of general conventional construction and operation, I have shown only a portion of the gearing of this transmission in Figs. 1, 2, and 3, 14 representing the gear changes adapted to be shifted by arm 15 and collar 16 associated therewith, this gear being shifted to the right as viewed in Fig. 1 for engagement with reverse idler gear 17 in order to effect a reverse drive from the normal direction of drive to the driven shaft 10. Idler gear 17 constantly meshes with the usual countershaft idler gear 17ᵃ. Thus, by appropriate actuation of the shift lever 11 gears 14 and 17 may be engaged so as to reverse the drive, it being understood that other manipulations of shift lever 11 are adapted to produce other desired speed ratio changes in the normal direction of rotation for driven shaft 10.

The power coming from the prime mover, (not shown herein), drives transmission B, and the power is taken from this transmission by a power driving means or shaft 18 rotatable in a bearing 19, the shaft having a portion extending rearwardly into the driving mechanism A, this extending portion of the shaft being provided with splines 20.

My driving mechanism B provides, among other things, an auxiliary driving means or mechanism between the driving and driven shafts 18 and 10 respectively, this driving means being preferably of a construction adapted to provide a speed ratio between the shafts of an overdriving character whereby driven shaft 10 may, under certain conditions hereinafter described, be driven from the driving shaft at a speed greater than a direct drive between these shafts, it being understood that the engine will in such instances be relatively slowed down with respect to its normal speed of actuation for a given speed of vehicle travel. If desired, the mechanism A may be rearranged to provide an underdrive instead of an overdrive, although I prefer to arrange the gearing for an overdrive for the driven shaft 10.

Splined to the forward portion of driving shaft 18, I have provided a clutch C preferably of the automatic type so as to be responsive in its actuation to the relative speeds of the driving and driven shafts in controlling the overdrive as will be more apparent hereinafter, this clutch C being provided with a collar 21 having an annular groove 22 engaged by a yoke 23, best shown in Fig. 3. This yoke extends laterally through an arm 24 to a hub 25 keyed or otherwise fixed at 26 to a shiftable rod 27 adapted to reciprocate in guides 28 and 29 provided by the casing of transmission B. The rear end of rod 27 is bored out to receive a spring 30 reacting against a fixed abutment 31, this spring 30 acting to normally move rod 27 to the left, as viewed in Fig. 3, to position the parts associated therewith as illustrated in Figs. 1, 2, and 3 of the drawings.

Carried by rod 27 and also keyed thereto at 32 is an arm 33 extending laterally inwardly of transmission B, this arm being normally spaced from reversing gear 14 but being adapted for engagement therewith during movement of this reversing gear into its position of engagement in gear 17 for establishing the aforesaid reverse drive. The arrangement is such that when gear 14 is shifted as aforesaid to its position for establishing the reverse drive, arm 33 will be engaged by gear 14 and moved to the right as viewed in Figs. 1 and 3, thereby also moving rod 27 and yoke 23 to the right for shifting the automatic clutch C along splines 20 of the driving shaft 18, the purposes of which will be later apparent.

In addition to the aforesaid manually operated means for shifting the position of the automatic clutch C in response to a setting of the reverse gearing of transmission B, I have also provided a further manually controlled means for shifting the automatic clutch C independently of the movement thereof under the influence of the reverse setting of the transmission. To this end the rod 27 is formed with shoulders 34 engaged by forks 35 of the upwardly extending arm or lever 36, this lever being pivotally mounted at 37 and being provided with a downwardly extending arm 38 adapted for movement by suitable linkage such as the Bowdin wire 39. This wire, as diagrammatically illustrated in Fig. 1, extends for convenient manipulation by the vehicle driver, such position being indicated by the usual vehicle dash 40 which mounts a handle or knob 41 connected to the other end of the Bowdin wire 39. The handle 41 is adapted for movement by the hand of the vehicle driver, the knob being guided from its normal position, illustrated in Fig. 1, to a position in spaced relationship from dash 40, in which extended position the guide portion 42 of the handle will register a notch 43 thereof with spring pressed ball 44 carried by guide block 45, the ball 44 and the notch 43 cooperating to advise the operator of the proper positioning of handle 41, and also determining and limiting the handle movement for effecting the desired swinging of lever 36 about its pivot 37. This swinging movement of the lever will move rod 27 against spring 30 to shift the automatic clutch C independently of movement of the reverse gear 14 as will be readily apparent from Figs. 1 and 3 of the drawings.

The general purpose of the shifting movement for the automatic clutch C is to establish a control for either the operation of the automatic clutch or else the operation of the overrunning or free wheeling clutch D, or both of these clutches if desired and embodied in the combination as a part of the driving mechanism. The clutch C has a rearward extension 46 provided with an annular series of teeth or jaws 46.

I preferably incorporate in my driving mechanism as a part of the primary driving means between driving shaft 18 and driven shaft 10 an overrunning or free wheeling clutch D, best shown in Figs. 1 and 4. This clutch may in itself be of any suitable form, the illustration showing a conventional device in which the inner cam member 48 is driven by the splines 20 of shaft 18, the cam faces 49 being engaged by cylinders 50 so that by the driving rotation of shaft 18 the high sides of cam faces 49 will wedge the cylinders 50 between cam member 48 and the outer cylindrical driven member 51 of the overrunning clutch to establish a direct drive thereto. The usual spacer 52 maintains the cylinders in spaced position, it being apparent that whenever the engine or driving shaft 18 slows down, the vehicle and driven shaft 10 may, by reason of clutch D, overrun the driving shaft, other conditions permitting such action as will be presently apparent.

The cylindrical portion 51 of the overrunning clutch D is formed as a forward extension of driven shaft 10, this cylindrical portion being centered for forming a housing around the rear end of driving shaft 18, a bearing 53 being interposed between the cam member 48 and the aforesaid cylindrical portion. This portion has a forward extension 54 provided with an annular series of internal teeth or jaws 55 complementary to the corresponding teeth 47 of the automatic clutch C, the arrangement being such that when clutch C is shifted to the right as aforesaid and as viewed in Fig. 1, teeth 47 and 55 will engage so as to lock out or render the overrunning clutch D ineffective or inoperative. In such instance it will be apparent that a direct drive is established between driving shaft 18 and driven shaft 10 through these engaging teeth and the outer portion 51 of the overrunning clutch D.

The driven shaft 10 may be provided with a gear 56 for driving the usual speedometer (not shown), this shaft being supported by suitable bearings, one of which is illustrated at 57. The driven shaft is further provided with a suitable gear forming the auxiliary driving means between the automatic clutch C and this driven shaft, the speed ratio of this auxiliary driving means determining the amount or degree of the overdrive between the driving and driven shafts. In the illustrated embodiment of my invention I have shown this auxiliary driving mechanism or overdrive in the form of an internal gearing, this gearing comprising a pinion 58 carried by the driven shaft 10 and meshing with an internal gear 59 of a countershaft 60 rotatable in bearings 61 and 62, the mounting of this countershaft providing an axis of rotation of the countershaft eccentric to the axis of the driven shaft 10, shown in Fig. 1. The countershaft has a forward extension provided with an external gear 63 meshing with an internal gear 64 formed in a hollow shaft or cylinder 65. This cylinder 65 is rotatably supported at its rear end by a bearing 66 and is journaled by a bushing 67 carried by the cylindrical portion 51 of the overrunning clutch D. This cylinder 65 has a forwardly extending sleeve or shell 68 providing the driven member of clutch C and cooperating therewith to establish the overrunning drive between the driving shaft 18 and the driven shaft 10, through the countershaft 60.

The shell 68 is formed with a circumferential series of spaced openings or slots 69 adapted to receive the pawls or dogs 70 of the clutch C. Referring now to this automatic clutch which is best shown in Figs. 1 and 5 to 7, the hub 21 is provided with diametrically arranged lateral extensions or pawl guides 71, these extensions having arcuate faces 72 fitting within shell 67. Extensions 71 have pawl engaging faces 73 and 74 of adjacent extensions 71 for slidably receiving the aforesaid pawls 70, each pawl having a recess 75 into which a pin 76 projects, as shown in Fig. 6. The pawls are limited in their inward movement by abutments 77, best shown in Fig. 6, these abutments extending axially between adjacent extensions 71.

In order to normally urge the pawls inwardly of the pawl cage or core, the latter being formed by reason of its extensions 71 and other structures for carrying the pawls, so as to position the parts as shown in Fig. 5, I have provided springs 78. Each spring is coiled a number of times around its associated pin 76 and extends therefrom in generally opposite directions within adjacent extensions 71, each spring having terminal portions 79 acting on the adjustable abutments 80 threaded into extensions 71, these threaded members 80 having tool receiving slots 81 permitting their ready adjustment to vary the spring tension.

The slots 69 of shell 68 are suitably arranged so that diametric pairs of slots will simultaneously register with the pawls 70 so as to receive these pawls to establish the operative or engaged condition of clutch C.

It will be noted that springs 78 may be readily adjusted from without the clutch by aligning each of the threaded members 80 with a slot 69, the clutch being disengaged, whereupon abutments 80 may be rotated to effect the desired adjustment in the tension of the spring governing the action of the pawls.

The outer ends of pawls 70 are preferably provided with cam faces 82 acting on the inner edges of slots 69 to progressively release the pawls outwardly under the action of centrifugal force when the clutch shell and cage are rotating substantially together at a predetermined desired speed. When the pawls move outwardly in slots 69, such movement is limited by engagement of pawl shoulders 82 with the portions of shell 68 adjacent slots 69 as shown in Fig. 7.

Before describing the operation of my driving mechanism, it will be noted that in Figs. 1 and 5 to 7, the automatic clutch is so arranged that the pawl carrying cage is driven from the engine or driving shaft 18, the companion clutch member or slot carrying shell 68 being driven from the vehicle ground wheels, (not shown), or driven shaft 10. The relative arrangement of driving the clutch parts may be readily reversed and in many instances this reversal of parts is desirable as will be presently apparent. In Figs. 8 to 11 I have illustrated this reversal of parts, the automatic clutch C' illustrated therein being adapted to be readily substituted for the automatic clutch C in the driving mechanism and associated assembly illustrated in Fig. 1 and hereinafter described in detail. For convenience and clarity, I have deemed it unnecessary to duplicate the aforesaid driving mechanism, but it will be apparent as the detailed description of this modified form of clutch progresses that such a clutch may be readily substituted for clutch C as aforesaid.

Thus, referring to Figs. 8 to 11, the same driving shaft 18 having splines 20 is provided between transmission B and the auxiliary drive A of Fig. 1, and I have also provided the same cylindrical portion 65 of the overdrive mechanism, this portion 65 terminating forwardly as before in the shell 68 having the annular series of slots 69. In Fig. 8 slots 69 are not pawl receiving slots as in the case of Fig. 1, but such slots have been used in order to provide interchangeability of clutches C and C'. In Fig. 8 I have also illustrated the forwardly extending portion 54 of the overrunning clutch, this portion having the aforesaid teeth or jaws 55 in this instance for engagement with companion teeth 47' of the sleeve 68' having splined engagement with splines 20 of driving shaft 18.

In Fig. 8 the hub 21' is formed with a groove 22' corresponding in position and function to the aforesaid groove 22 of Fig. 1, this groove 22' being engaged by the same yoke 23 which is adapted for actuation as hereinafter described. The collar 21' is loosely mounted for rotation on sleeve or shell 68' so that when collar 21' is shifted to the left as viewed in Fig. 8, the shell 68' and also the pawl carrying cage or core associated therewith will be moved to the left with the shell. When collar 21' is moved to the right by yoke 23, the pawl carrying cage will be moved correspondingly by reason of the engagement between collar 21' and the pawl cage.

The pawl cage of Fig. 8 together with the pawls 75 associated therewith are driven from the cylindrical member 65 by reason of the engagement of driving lugs 85 carried by extensions 71 with a pair of diametrically spaced slots 69. As noted in Fig. 10, these lugs 85 preferably do not extend the full length of slots 69 but preferably engage the outer extremities of the slots so as to permit the clutch C' to be shifted to the right with the lugs 85 remaining in engagement with the respective slots 69. The extensions 71' are generally arranged so as to correspond with extensions 71 of clutch C whereby they are formed with corresponding pawl guiding surfaces 73' and 74', pawls 70' having pins 76' engaged by springs 78'. These springs have similar oppositely extending end portions 79' adjustable by the abutment members 80', the shell 68 having suitable openings 86 normally aligned with abutments 80' so as to provide access thereto for effecting the desired adjustment of springs 78' in a manner similar to the adjustment of springs 78 of clutch C.

Inward movement under the influence of springs 78' of the pawls 70' is limited by engagement of the inner arcuate faces 87 of the pawls with a cylindrical bushing 88 carried by the shell or sleeve 68', as best seen in Fig. 9.

The pawls 70' are provided with axially or laterally spaced slot engaging portions 89, each of which is formed with a cam face 82' similar to the cam faces 82 of pawls 70. It will be noted from Fig. 8 that the actuating portions 89 of pawls 70' are disposed for engagement with slots 69' of shell 68', the manner of engagement of pawls 70' with the respective slots 69' being similar on outward movement of the pawls to the desired engagement of pawls 70' with the associated slots 69 of clutch C. In Fig. 9, the clutch C' is illustrated in the disengaged position, the cam faces 82' of pawls 70' being aligned with the companion slots 69' of shell 68'. In Fig. 11 I have illustrated the pawls 70' extended outwardly into engagement with the slots 69', the clutch C' being thereby illustrated in the engaged or clutched position.

It will be apparent that when clutch C' is shifted to the right as viewed in Fig. 8, teeth 47' and 55 will be placed in connected or locked engagement corresponding to the engagement aforesaid for teeth 47 and 55 of clutch C.

From the foregoing description of Figs. 8 to 11, it will be apparent that the pawls 70' together with the pawl carrying cage associated therewith are driven at all times with the cylindrical member 65 by reason of the engagement of driving lugs 85 with a pair of slots 69. It will further be noted that the pawl engaging slots 69' of shell 68' will at all times be driven with the driving shaft 18 by reason of the splined engagement of the shell therewith, this arrangement providing a reversal of the corresponding cooperating parts of the clutch C' wherein the pawl carrying cage is driven from the driving shaft 18 and the shell having the pawl receiving slots are driven with the cylindrical portion 65 or the driven shaft 10.

While I do not limit my invention to any particular relationship of spring forces and centrifugal force acting on the pawls, improved performance of automatic clutches of the pawl type referred to herein may be obtained by providing a substantially balanced or floating pawl at the speed of rotation of the pawl cage where clutching action is desired. Thus, I prefer to arrange the spring rate of springs 78' or 78 so that at the critical speed at which clutch engagement is desired to take place, the centrifugal force acting on any pawl will be substantially counterbalanced by the pull of the pawl spring so that the pawl can readily move outwardly into clutching position. At the end of the outward pawl movement, the increased centrifugal force due to the outward displacement of the center of gravity of any pawl is preferably also substantially counterbalanced by the inward pull of the spring associated therewith. Centrifugal force is proportional to the distance of the center of gravity of a rotating mass from its axis, and the increase of the center of gravity distance is counterbalanced by an increase of the spring load occasioned by the pawl movement. The spring rate is thus one which preferably balances the increase in centrifugal force during outward pawl movement and by reason of this preferred arrangement the pawls may be made to quickly engage and disengage the slots of the associated clutch member within a relatively narrow difference in speeds of these clutch parts, the small difference in speed for clutch engagement and disengagement being occasioned largely by the small amount of friction acting against initial movement of the pawls.

In operation of the driving mechanism and parts associated therewith as positioned in Figs. 1 to 6, the engine acting through transmission B will drive the driving shaft 18 to drive the driven shaft 10 so as to operate the vehicle forwardly in direct drive, so far as the driving and driven shafts 18 and 10 respectively are concerned. This direct drive takes place from shaft 18 through the overrunning clutch D and thence to driven shaft 10. When the vehicle tends to overrun the engine, or when driven shaft 10 tends to overrun driving shaft 18, such action may take place by reason of clutch D. During this direct drive the hub 21 and pawl cage of the clutch C associated therewith will be driven at the speed of shaft 18, while the companion clutch member or shell 68 with slots 69 thereof will be rotated in the same direction but at less speed than that of shafts 10 and 18, by reason of the reduction gearing through the auxiliary mechanism from shaft 10 to shell 68. The difference in speeds between shell 68 and shaft 18 is determined by the ratio of the gearing of the auxiliary driving mechanism, it being understood that this may be varied in accordance with the desired amount of overdrive.

By way of illustrating one manner of operation of my automatic clutch C, this clutch is illustrated as being adapted to automatically lock out or to render the overrunning clutch D ineffective, thereby simultaneously driving or connecting the driving shaft 18 with driven shaft 10 by reason of the auxiliary driving mechanism, this driving connection being adapted to take place at a predetermined desired speed of rotation of driven shaft 10 and hence a predetermined speed of vehicle travel. When such clutching action takes place, the shaft 10 is then driven from driving shaft 18, such drive providing an overdrive or a higher speed of driven shaft 10 than that of driving shaft 18.

An overdrive is ordinarily desirable at only relatively high speeds of vehicle travel and hence, by a suitable setting of the pawl springs, the pawls may be held inoperative against the influence of centrifugal force acting to move the pawls outwardly, until the desired predetermined critical speed has been reached. Assuming, by way of example, that such automatic overdrive is desired at approximately 50 miles per hour of vehicle travel, then, when the vehicle is being driven at this speed, referring now to the clutch C' of Figs. 8 to 11 wherein the pawls 70' thereof are driven with driven shaft 10, these pawls are urged outwardly by centrifugal force to engage the slots 69' of shell 68' when rotation of the pawl cage and shell become substantially uniform. Under the assumed conditions, the pawl springs may be set so that the pawls tend to fly outwardly at the speed of shaft 10 corresponding to 50 miles per hour of vehicle travel, the pawls being restrained from moving outwardly, until the clutch parts are synchronized, by reason of the gear reduction of the auxiliary driving mechanism which drives the pawls at a slower speed than that of slots 69' which are driven directly from the drive shaft 18. Owing to the difference in rotational speed in slots and pawls, these parts pass each other with such rapidity that the pawls do not have time to move outwardly to engage the slots, and the parts continue to slip until the operator momentarily releases or diminishes the power of the engine applied to shaft 18, so as to permit the shell 68' to decelerate.

In deceleration, the shell 68' obviously very quickly drops to the speed of the pawl cage, momentarily synchronizing the pawls with a pair of diametrically arranged slots, the pawls thereupon being guided outwardly during rotation thereof by cam faces 82' for effecting initial engagement of the pawls in the slots. Once engaged, the centrifugal force acting on the pawls carries them outwardly for fully engaging the slots of shell 68' and the overdrive immediately takes place with the free wheeling clutch D locked out as aforesaid.

I have first referred to the action of automatic clutch C' as the arrangement thereof is somewhat preferred in many instances over that provided by automatic clutch C of Fig. 5. From the foregoing description of the action of clutch C' as shown in Fig. 8 it will be apparent that when clutch engagement takes place the engine continues to drive the driven shaft 10 at the overdrive speed from the time the pawls are engaged in the pawl slots, viz., at a speed slower than in direct drive for the same vehicle speed. With the arrangement illustrated in Fig. 5 for automatic clutch C, the engine would have to operate considerably faster by the overdrive ratio than the driven shaft 10 to speed up its slot carrying member or shell 68, and then by slowing down the engine momentarily to reduce the speed of the pawl cage to that of the slot carrying member, the pawls will engage the slots. In such instance, it is, therefore, apparent that the engine would have to drive at a speed greater than its speed for the overdrive setting of the pawls 70 in order to establish the proper conditions for effecting actuation of the automatic clutch C. The manner in which the pawls 70 are retained in place until substantial synchronism of the companion clutch parts occurs, and the manner of advancing the pawls is similar to that described hereinafter in connection with the clutching and declutching actions of pawls 70' of the automatic clutch C'.

As long as the engine drives the vehicle at or above the aforesaid overdrive speed, with the pawls of either clutch C or C' engaged in their respective slots, such clutch will remain engaged. However, when the vehicle slows down below the aforesaid assumed 50 miles per hour of travel, the pawls will be urged to their retracted or normal position of Fig. 5 for clutch C, or Fig. 9 for clutch C', such retraction taking place just as soon as the friction of the drive is relieved or reversed between the sides of the slots or pawls. Thus, when the vehicle driver momentarily releases the usual accelerator pedal (not shown) to cause the vehicle to drive the engine, it being remembered that the overrunning clutch D is in such instance ineffective, this reversal of drive permits retraction of the pawls and the driving mechanism is then again operating without the overdrive, the overrunnnig clutch D being automatically operative.

When it is desired to drive the vehicle in reverse, shifter 11 is moved to actuate shifter rod 15 to the right, as viewed in Fig. 1, so as to move clutch C to the right and thereby engage teeth 47 and 55 to lock out the free wheel clutch D. It will be noted that in the case of clutch C, this shifting movement displaces the pawl cage and pawls 70 associated therewith out of alignment with the companion slots 69 so that when clutch C is shifted to the right, the automatic overdrive or auxiliary driving mechanism is placed in an inoperative or ineffective condition, this being more important in reference to the shifting of clutch C by the handle 41, as hereinafter more particularly referred to. The aforesaid shifting of transmission gear 14 to establish the reverse drive provides for a drive from driving shaft 18 through teeth 47 and 55 and thence to the outer member 51 of the overrunning clutch D, the driven shaft 10 taking this reversal of drive brought about in transmission B. In the case of the clutch C', when this clutch is shifted to the right as viewed in Fig. 8, pawls 70' are also carried within shell portion 68 preventing outward movement of the pawls into clutch engaging position.

When clutch C' of Figs. 8 to 11 is shifted to the right as viewed in Fig. 8 by the yoke 23, it will be noted that the companion teeth 47' and 55 are engaged to establish the drive of driven shaft 10 from driving shaft 18 directly through the outer member of the overrunning clutch D in the same manner as described in connection with the corresponding operation of shifting clutch C. This axial shifting of clutch C' is permitted by driving lugs 85 taking up the clearance provided axially of slots 69 as best shown in Fig. 10. When the vehicle driver desires to actuate the clutch C or the clutch C' in order to lock out the overrunning clutch D, he pulls handle 41 to engage notch 43 with the ball detent 44, such actuation swinging lever 36 and moving rod 27 against the action of spring 30, this movement effecting the aforesaid shifting action of clutch C or C' to respectively engage the sets of companion teeth associated therewith, namely, teeth 47 and 55 or 47' and 55. In either instance the manual shifting of clutch C or C' by handle 14 may be brought about independently of the shifting of these clutches by reason of movement of transmission reverse gear 14. The spring 30 tends to restore the parts associated therewith including clutches C or C' to the normal position respectively illustrated in Figs. 1 and 6.

In Fig. 5 the adjusting members or abutments 80 may be reached for adjustment by aligning these members through one of the slots 69, and in Fig. 9 the corresponding adjustment for the abutments 80' may be effected by reason of openings 86, which are always in alignment with these abutments.

I do not limit my invention, in the broader aspects thereof, to the particular combination and arrangement of parts shown and described for illustrative purposes, since various modifications will be apparent within the teachings of my invention as defined in the appended claims.

What I claim is:

1. In a drive for a motor vehicle having a power driving shaft and a shaft driven therefrom and adapted to drive said vehicle, overdriving means between said shafts for driving said driven shaft at a speed greater than the speed of the driving shaft, and a speed responsive clutch controlling said overdriving means, said clutch including clutching structures respectively drivingly connected to said driving and driven shafts, said clutch being adapted to automatically connect said shafts through said overdriving means, a hollow cylindrical shaft concentric with said driving and driven shafts and adapted to transmit a drive between said driven shaft and one of said clutching structures, said driving shaft having an end portion thereof extending concentrically through the other of said clutching structures and within said hollow shaft.

2. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means between said shafts for driving said driven shaft at a speed greater than the speed of the driving shaft, and a clutch including clutching structures respectively drivingly connected to said driving and driven shafts for controlling said overdriving means, said overdriving means including a cylindrical member drivingly connected to one of said clutching structures and to said driven shaft, said cylindrical member extending from said driven shaft into concentric telescoping relationship with an end portion of said driving shaft, said clutching structures lying within said cylindrical member, said clutch being adapted to automatically connect said shafts through said overdriving means in response to a predetermined speed of rotation of at least one of said shafts.

3. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means between said shafts for driving said driven shaft at a speed greater than the speed of the driving shaft, and a clutch including clutching structures respectively drivingly connected to said driving and driven shafts for controlling said overdriving means, said overdriving means including a member adapted to transmit the overdrive from one of said clutching structures to said driven shaft, said member extending beyond said overrunning clutch and around an end portion of said driving shaft, said clutch being adapted to automatically connect said shafts through said overdriving means, said overdriving means being adapted to render said overrunning clutch inoperative in response to clutching action of said automatically connecting clutch.

4. In a power transmission for a motor vehicle having a power driving shaft and a shaft driven therefrom and adapted to drive the vehicle, means including an overrunning clutch intermediate said shafts for driving said driven shaft from and at the same speed as said driving shaft and for releasing said drive when said driven shaft overruns said driving shaft, overdriving means between said shafts for driving said driven shaft at a speed greater than the speed of the driving shaft, and a clutch including clutching structures respectively drivingly connected to said driving and driven shafts for controlling said overdriving means, said clutch being adapted to automatically connect said shafts through said overdriving means, and manually controlled means for rendering said overrunning clutch inoperative with said second clutch thereby also rendered inoperative.

5. In a power transmission for a motor vehicle having a power driving shaft and a shaft driven therefrom and adapted to drive the vehicle, direct driving means including an overrunning clutch intermediate said shafts for driving said driven shaft from said driving shaft at the same speed and for releasing said drive when said driven shaft overruns said driving shaft, overdriving means between said shafts for driving said driven shaft at a speed greater than the speed of the driving shaft, and a clutch including clutching structures respectively drivingly connected to said driving and driven shafts for controlling said overdriving means, said clutch being adapted to automatically and positively connect said shafts through said overdriving means, and manually controlled means rendering said overrunning clutch and said automatically connecting clutch simultaneously inoperative.

6. In a vehicle drive, power driving means, means driven by said power driving means and adapted to drive the vehicle, means including an overrunning clutch for driving said driven means from said driving means and for releasing the drive when said driven means overruns said driving means, auxiliary means intermediate said driving means and driven means for driving said driven means at a speed greater than that of said driving means, a second clutch adapted to control the drive between said driving means and said auxiliary driving means, manually controlled means for reversing the direction of drive between said driving and driven means, means including clutching members respectively drivingly connected to said driving and driven means, and means responsive to actuation of said manually controlled means for clutching said clutching members thereby rendering said overrunning clutch inoperative, said overruning clutch having a driven clutch portion drivingly connected to said driven means and to that clutching member which is drivingly connected to said driven means, said second clutch being adapted to automatically establish said drive between said driving means and said auxiliary driving means.

7. In a vehicle drive, power driving means, means driven by said power driving means and adapted to drive the vehicle, means including an overrunning clutch for driving said driven means from said driving means and for releasing the drive when said driven means overruns said driving means, auxiliary means intermediate said driving means and driven means for driving said driven means at a speed greater than that of said driving means, a second clutch adapted to control the drive between said driving means and said auxiliary driving means, manually controlled means for reversing the direction of drive between said driving and driven means, means including clutching members respectively drivingly connected to said driving and driven means, and means responsive to actuation of said manually controlled means for clutching said clutching members thereby rendering said overrunning clutch inoperative, said overrunning clutch having a driven clutch portion drivingly connected to said driven means and to that clutching member which is drivingly connected to said driven means, said second clutch being adapted to automatically establish said drive between said driving means and said auxiliary driving means, said second clutch being adapted to render said overrunning clutch inoperative independently of said manually controlled means.

8. In a device of the character described, a driving shaft, a driven shaft extending rearwardly of said driving shaft and having a forwardly extending substantially cylindrical portion receiving therewithin the rear end of said driving shaft, a cam mounted on said rear end of the driving shaft and lying substantially within said cylindrical portion of said driven shaft, overrunning clutch means between said cam and said cylindrical portion of said driven shaft whereby to drive said driven shaft from said drive shaft and to release said drive when said driven shaft overruns said drive shaft, said cylindrical portion of said driven shaft having clutch teeth forwardly of said overrunning clutch means, a driving pinion carried by said driven shaft rearwardly of the said rear end of the driving shaft, a cylindrical countershaft journalled eccentrically with respect to said driven shaft, said countershaft having an internal gear meshing with said pinion and an external gear spaced forwardly therefrom, a sleeve structure mounted for rotation concentrically with said driving structure, said sleeve structure having an internal gear meshing with said countershaft external gear and extending forwardly therefrom beyond said overrunning clutch means, a second clutch structure splined to said driving shaft and adapted to connect said driving shaft and said sleeve structure in response to a predetermined substantially equal speed of rotation of said driving shaft and said sleeve structure, said second clutch structure having clutch teeth engageable with said clutch teeth of said cylindrical portion of the driving shaft, and manually controlled means for shifting said second clutch structure longitudinally of said driving shaft to engage the clutch teeth of said cylindrical portion with the clutch teeth of said second clutch structure to render said overrunning clutch and said second clutch inoperative.

9. In a power driving mechanism having a driving shaft and a shaft driven therefrom, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, means for driving one of said structures from said driving shaft and at the same speed as that of said driving shaft, and means for driving the other of said structures from said driven shaft and at a speed less than that of said driving shaft, said driving means being adapted to drive said structures at said relatively different speeds when said driving shaft drives said driven shaft through said overrunning clutch, said clutching structures being adapted to establish a positive overdrive from said driving shaft to said driven shaft through said driving means in response to overrun of the driving shaft by said driven shaft.

10. In a power transmission for a motor vehicle having a power driving shaft and a shaft driven therefrom and adapted to drive the vehicle, said driving and driven shafts being coaxially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said clutching structures one to said driving shaft and the other to said driven shaft whereby said clutching structures are driven at relatively different speeds when the driving shaft drives the driven shaft through said overrunning clutch, clutch teeth drivingly connected to said driven shaft, clutch teeth carried by one of said clutching structures, and manually operable means for shifting the last said clutching structure to engage said drivingly connected clutch teeth for drivingly connecting said driving and driven shafts independently of said overrunning clutch.

11. In a power transmission for a motor vehicle having a power driving shaft and a shaft driven therefrom and adapted to drive the vehicle, said driving and driven shafts being coaxially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said clutching structures one to said driving shaft and the other to said driven shaft whereby said clutching structures are driven at relatively different speeds when the driving shaft drives the driven shaft through said overrunning clutch, manually engageable clutch means including clutching elements respectively connected to one of said shafts and to one of said clutching structures, and manually operable means for shifting the last said clutching structure to engage said clutching elements.

12. In a vehicle drive, a speed ratio changing transmission having a power take-off driving shaft, an over-driving mechanism associated with said transmission and having a shaft aligned with said driving shaft and adapted to be driven therefrom for driving the vehicle, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, means for driving one of said structures from said driving shaft, means for driving the other of said structures from said driven shaft, said driving means being adapted to drive said structures at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft, clutch teeth drivingly connected to said driven shaft, clutch teeth carried by one of said clutching structures, and manually operable means for shifting the last said clutching structure to engage the clutch teeth thereof with said drivingly connected clutch teeth for drivingly connecting said driving and driven shafts independently of said over-running clutch.

13. In a power transmission for a motor vehicle having a power driving shaft and a shaft driven therefrom and adapted to drive the vehicle, said driving and driven shafts being coaxially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said clutching structures one to said driving shaft and the other to said driven shaft whereby said clutching structures are driven at relatively different speeds when the driving shaft drives the driven shaft through said overrunning clutch, manually operable means for reversing the normal direction of drive of said driving shaft, and clutching means actuated by said manually operable means for positively drivingly connecting said driving and driven shafts whereby to render said overrunning clutch inoperative.

14. In a vehicle drive, a speed ratio changing transmission having a power take-off driving shaft, an over-driving mechanism associated with said transmission and having a shaft aligned with said driving shaft and adapted to be driven therefrom for driving the vehicle, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, means for driving one of said structures from said driving shaft, means for driving the other of said structures from said driven shaft, said driving means being adapted to drive said structures at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft, manually operable means for adjusting said transmission for reversing the normal direction of drive of said driving shaft, and clutching means actuated by said manually operable means for positively drivingly connecting said driving and driven shafts whereby to render said overrunning clutch inoperative.

15. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driving shaft, means for driving the other of said structures from said driven shaft, at least one of said driving means including a gear train adapted to drive its associated clutching structure at a speed different from that imparted to the other of said structures when said driving shaft drives said driven shaft through said overrunning clutch, manually operable means for reversing the normal direction of drive of said driving shaft, and clutching means actuated by said manually operable means for positively drivingly connecting said driving and driven shafts whereby to render said overrunning clutch inoperative.

16. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driving shaft for rotation at the same speed therewith, means including a gear train for driving the other of said structures from said driven shaft whereby said structures rotate at different speeds when said driven shaft is driven through said overrunning clutch, said driven shaft being driven from said driving shaft through said clutching structures and said driving means therefor when said structures are clutched whereby to drive said driven shaft at a speed different than that of said driving shaft, manually operable means for reversing the normal direction of drive of said driving shaft, and clutching means actuated by said manually operable means for positively drivingly connecting said driving and driven shafts whereby to render said overrunning clutch inoperative.

17. In a drive for a motor vehicle having a power driving shaft and a shaft driven therefrom and adapted to drive said vehicle, overdriving means between said shafts for driving said driven shaft at a speed greater than the speed of the driving shaft, said overdriving means including a speed responsive clutch controlling the drive through said overdriving means, said speed responsive clutch including positively engageable clutching structures respectively adapted for driving connection to said driving and driven shafts at least when said structures are clutched, said overdriving means comprising a gear train drivingly connecting one of said shafts with one of said clutching structures and including an internal gear having a hollow cylindrical driving extension disposed concentrically around one of said shafts, means for drivingly connecting the other of said clutching structures with the other of said shafts, one of said clutching structures being disposed within said cylindrical driving extension.

18. In a vehicle drive, power driving means including a driving shaft, means including a shaft driven by said power driving means and adapted to drive the vehicle, direct driving means including a releasable clutch for driving said driven means from said driving shaft and for releasing the drive to provide relative rotation between said driving and driven shafts, auxiliary means intermediate said driving and driven means for driving said driven means independently of said drive through said direct driving means and at a speed greater than that of said driving means, means operable upon and limited in the operation thereof to drive of the vehicle at or above a predetermined speed for controlling operation of said auxiliary driving means, manually controlled means for reversing the direction of drive of said driving shaft, and means operable to drivingly couple said driving shaft to said driven means for a reverse drive in response to actuation of said manually controlled means accompanied by a reverse drive of said driving shaft.

19. In a vehicle drive, a power driving shaft, a shaft driven by said driving shaft and adapted to drive the vehicle, and means intermediate said driving and driven shafts for selectively driving said driven shaft at the same speed as that of said driving shaft and at an overdrive speed, said intermediate driving means including a centrifugal force actuated clutch member and a second clutch member adapted to drivingly receive said centrifugal member to provide a positive clutch control for said overdrive, means for drivingly coupling one of said clutch members directly with said driving shaft for rotation at the same speed therewith at least prior to clutching engagement of said clutch members, said coupling means including means for mounting the last said clutch member on said driving shaft, and means including an overdrive gear train for drivingly coupling the other of said clutch members with one of said shafts for rotation at a speed less than that of said directly coupled clutch member prior to clutching engagement of said clutch members, said clutch members being so constructed and arranged as to couple said shafts through said overdrive gear train when said clutch members are engaged.

20. In a vehicle drive, a power driving shaft, a shaft driven by said driving shaft and adapted to drive the vehicle, and means intermediate said driving and driven shafts for selectively driving said driven shaft at the same speed as that of said driving shaft and at an overdrive speed, said intermediate driving means including a centrifugal force actuated clutch member and a second clutch member adapted to drivingly receive said centrifugal member to provide a positive clutch control for said overdrive, means for drivingly coupling said centrifugal member directly with said driving shaft for rotation at the same speed therewith at least prior to clutching engaging of said clutching members, said coupling means including means for mounting said centrifugal member on said driving shaft, and means including an overdrive gear train for drivingly coupling said second clutch member with one of said shafts for rotation at a speed less than that of said centrifugal member prior to clutching engagement of said clutch members, said clutch members being so constructed and arranged as to couple said shafts through said overdrive gear train when said clutch members are engaged.

21. In a vehicle drive, a power driving shaft, a shaft driven by said driving shaft and adapted to drive the vehicle, and means intermediate said driving and driven shafts for selectively driving said driven shaft at the same speed as that of said driving shaft and at an overdrive speed, said intermediate driving means including a centrifugal force actuated clutch member and a second clutch member adapted to drivingly receive said centrifugal member to provide a positive clutch control for said overdrive, means for drivingly coupling said second clutch member directly with said driving shaft for rotation at the same speed therewith at least prior to clutching engagement of said clutching members, said coupling means including means for mounting said second clutch member on said driving shaft, and means including an overdrive gear train for drivingly coupling said centrifugal member with one of said shafts for rotation at a speed less than that of said second clutch member prior to clutching engagement of said clutching members, said clutch members being so constructed and arranged as to couple said shafts through said overdrive gear train when said clutch members are engaged.

22. In an automatic change speed drive for motor vehicles, a driving shaft, a driven shaft aligned therewith, means for transmitting a releasable drive from said driving shaft to said driven shaft, gear train means for driving said driven shaft from said driving shaft at a speed ratio greater than that of said releasable drive, speed responsive clutching means comprising positively clutching structures drivingly associated with said shafts and adapted to drivingly connect said shafts through said gear train means, one of said clutching structures including a centrifugal force operated clutching element engageable with the other of said clutching structures, and means for mounting said centrifugal element and its said clutching structure on said driving shaft for rotation at the same speed therewith.

23. In an automatic change speed drive for motor vehicles, a driving shaft, a driven shaft aligned therewith, means for transmitting a releasable direct drive from said driving shaft to said driven shaft, gear train means for driving said driven shaft from said driving shaft at a speed ratio greater than that provided by said direct drive, speed responsive clutching means comprising positively clutching structures drivingly associated with said shafts and adapted to drivingly connect said shafts through said gear train means in response to a reduction in the speed of the driving shaft below that of the driven shaft for substantially synchronizing the speeds of said clutching structures, and means for driving one of said clutching structures at the speed of said driving shaft and the other at a lesser speed during said direct drive.

24. In a motor vehicle, aligned driving and driven shafts, change speed means for driving said driven shaft at the same speed as that of the driving shaft or at an overdriving speed, including, cooperating clutching structures, one of which is actuated by centrifugal force for positive clutching engagement with the other when the speed of the driving shaft is reduced below the speed of the driven shaft to substantially synchronize the speeds of said clutching structures, a gear train adapted for driving connection to one of said shafts and including an internal gear provided with a hollow cylindrical driving extension disposed for rotation concentrically with the last said shaft and operatively connected to one of said clutching structures for driving the same at a speed different from that of the other of said shafts prior to clutching engagement of said clutching structures, means for driving the other of said clutching structures from one of said shafts at the same speed, and releasable direct driving means for driving said driven shaft at the same speed with the driving shaft.

25. In a motor vehicle, aligned driving and driven shafts, change speed means for driving said driven shaft at the same speed as that of the driving shaft or at an overdriving speed, including, cooperating clutching structures, one of which is actuated by centrifugal force for positive clutching engagement with the other when the speed of the driving shaft is reduced below the speed of the driven shaft to substantially synchronize the speeds of said clutching structures, a gear train adapted for driving connection to one of said shafts and including an internal gear provided with a hollow cylindrical driving extension disposed for rotation concentrically with the last said shaft and operatively connected to one of said clutching structures for driving the same at a speed different from that of the other of said shafts prior to clutching engagement of said clutching structures, means for driving the other of said clutching structures from one of said shafts at the same speed, a cylindrical clutching member carried by said driven shaft, a cammed clutching member adapted to be driven by said driving shaft, a roller between said cam and cylindrical clutching member, said driving shaft having an end portion extending concentrically within said hollow driving extension and within said cylindrical clutching member for mounting said cam.

26. In a motor vehicle, aligned driving and driven shafts, change speed means for driving said driven shaft at the same speed as that of the driving shaft or at an overlapping speed, including, a gear train adapted for driving connection to one of said shafts and including an internal gear provided with a hollow cylindrical driving extension disposed for rotation concentrically with the last said shaft for driving said cylindrical extension at a speed different from that of the other of said shafts when said driven shaft is driven at the same speed as that of the driving shaft, said extension being provided with a clutching slot, a centrifugal force operated clutching element adapted for positive clutching engagement with said slot when the speed of the driving shaft is reduced below the speed of the driven shaft to substantially synchronize the speeds of said slot and clutching element, means for driving said clutching element from one of said shafts at the same speed, and releasable direct driving means for driving said driven shaft at the same speed with the driving shaft.

27. In a motor vehicle, aligned driving and driven shafts, change speed means for driving said driven shaft at the same speed as that of the driving shaft or at an overdriving speed, including, cooperating clutching structures, one of which is actuated by centrifugal force for positive clutching engagement with the other when the speed of the driving shaft is reduced below the speed of the driven shaft to substantially synchronize the speeds of said clutching structures, a gear train adapted for driving connection to one of said shafts and including an internal gear provided with a hollow cylindrical driving extension disposed for rotation concentrically with the last said shaft for driving one of said clutching structures at a speed different from that of the other of said shafts prior to clutching engagement of said clutching structures, means for driving the other of said clutching structures from one of said shafts at the same speed, and means operably connecting said driving and driven shafts for transmitting a releasable two-way drive therebetween.

28. In a motor vehicle, aligned driving and driven shafts, change speed means for driving said driven shaft at the same speed as that of the driving shaft or at an overdriving speed, including, cooperating clutching structures, one of which is actuated by centrifugal force for positive clutching engagement with the other when the speed of the driving shaft is reduced below the speed of the driven shaft to substantially synchronize the speeds of said clutching structures, a gear train adapted for driving connection to one of said shafts and including an internal gear provided with a hollow cylindrical driving extension, concentrically surrounding the end of the other of said shafts for driving one of said clutching structures at a speed different from that of said other shaft prior to clutching engagement of said clutching structures, means for driving the other of said clutching structures from one of said shafts and at the same speed therewith, and releasable direct driving means disposed within said cylindrical extension for driving said driven shaft at the same speed with the driving shaft.

29. In a motor vehicle drive, aligned driving and driven shafts, means including a gear train intermediate said driving and driven shafts for driving said driven shaft at a speed greater than that of said driving shaft, said intermediate driving means including cooperating clutching structures, one of which is actuated by centrifugal force for positive clutching engagement with the other when the speeds of said clutching structures are substantially synchronized, means for mounting one of said clutching structures on said driving shaft, the last said clutching structure being adapted for driving connection with said driving shaft for rotation at the same speed therewith prior to clutching engagement with the other of said clutching structures, the said other clutching structure being drivingly connected with one of said shafts through said gear train for rotation at a speed differing therefrom, and releasable means for driving said driven shaft from said driving shaft at the same speed therewith prior to engagement of said clutching structures, said releasable driving means being adapted to release said drive for effecting engagement of said clutching structures when the speeds thereof are substantially synchronized as aforesaid.

30. In a motor vehicle drive, aligned driving and driven shafts, means including a gear train intermediate said driving and driven shafts for driving said driven shaft at a speed greater than that of said driving shaft, said intermediate driving means including cooperating clutching structures, one of which is actuated by centrifugal force for positive clutching engagement with the other when the speeds of said clutching structures are substantially synchronized, means for mounting one of said clutching structures on said driving shaft, the last said clutching structure being adapted for driving connection with said driving shaft for rotation at the same speed therewith prior to clutching engagement with the other of said clutching structures, the said other clutching structure being drivingly connected with one of said shafts through said gear train for rotation at a speed different therefrom, and releasable means for driving said driven shaft from said driving shaft at the same speed therewith prior to engagement of said clutching structures, said releasable driving means being adapted to release said drive for effecting engagement of said clutching structures when the speeds thereof are substantially synchronized as aforesaid, said gear train means including a hollow cylindrical driving member concentrically surrounding a portion of said driving shaft and said clutching structure mounted thereon.

31. In a motor vehicle drive, aligned driving and driven shafts, means including a gear train intermediate said driving and driven shafts for driving said driven shaft at a speed greater than that of said driving shaft, said intermediate driving means including cooperating clutching structures, one of which is actuated by centrifugal force for positive cutching engagement with the other when the speeds of said clutching structures are substantially synchronized, means for mounting one of said clutching structures on said driving shaft, the last said clutching structure being adapted for driving connection with said driving shaft for rotation at the same speed therewith prior to clutching engagement with the other of said clutching structures, the said other clutching structure comprising a slotted cylinder drivingly connected to a gear of said gear train for rotation at a speed differing from that of said centrifugal force operated clutching structure prior to clutching engagement of said clutching structures.

32. In a motor vehicle drive, aligned driving and driven shafts, means including a gear train intermediate said driving and driven shafts for driving said driven shaft at a speed greater than that of said driving shaft, said intermediate driving means including cooperating clutching structures, one of which is actuated by centrifugal force for positive clutching engagement with the other when the speeds of said clutching structures are substantially synchronized, means for mounting one of said clutching structures on said driving shaft, the last said clutching structure being adapted for driving connection with said driving shaft for rotation at the same speed therewith prior to clutching engagement with the other of said clutching structures, the said other clutching structure comprising a slotted cylinder drivingly connected to a gear of said gear train for rotation at a speed differing from that of said centrifugal force operated clutching structure prior to clutching engagement of said clutching structures, and means drivingly carried by said driving and driven shafts for transmitting a releasable direct drive therebetween for forward and reverse directions of rotation of said driving shaft.

33. In a motor vehicle drive, aligned driving and driven shafts, means including a gear train intermediate said driving and driven shafts for driving said driven shaft at a speed greater than that of said driving shaft, said intermediate driving means including cooperating clutching structures, one of which is actuated by centrifugal force for positive clutching engagement with the other when the speeds of said clutching structures are substantially synchronized, means for mounting said centrifugal force operated clutching structure on said driving shaft, the last said clutching structure being adapted for driving connection with said driving shaft for rotation at the same speed therewith prior to clutching engagement with the other of said clutching structures, the said other clutching structure being drivingly connected with one of said shafts for rotation at a speed differing therefrom, and releasable means for driving said driven shaft from said driving shaft at the same speed therewith prior to engagement of said clutching structures, said releasable driving means being adapted to release said drive for effecting engagement of said clutching structures when the speeds thereof are substantially synchronized as aforesaid.

34. In a power transmission for a motor vehicle having a power driving shaft and a shaft driven therefrom and adapted to drive the vehicle, said driving and driven shafts being coaxially arranged for relative rotation, an over-running clutch including inner and outer clutch members, one of which is drivingly connected to said driving shaft and the other of which is drivingly connected to said driven shaft for driving said driven shaft from said driving shaft at the same rotational speed and for releasing said drive when said driven shaft over-runs said driving shaft, clutch controlled means including reduction gearing constructed and arranged for overdriving said driven shaft from said driving shaft, said clutch controlled overdriving means further including a cylindrical clutching structure having a pawl receiving slot, means for mounting said cylindrical clutching structure for rotation concentrically with said shafts, and a second clutching structure having a centrifugal force actuated pawl adapted for engagement in said slot to positively couple said clutching structures when the rotational speeds thereof are substantially the same, means for directly drivingly connecting said second clutching structure to said driving shaft, said clutch controlled overdriving means being so constructed and arranged that said cylindrical clutching structure is rotated through said reduction gearing at a speed less than that of said second clutching structure when the driving shaft drives the driven shaft through said over-running clutch.

35. In a driving mechanism for a motor vehicle, a power driving shaft, a shaft driven by said driving shaft and adapted to transmit the drive therefrom to actuate the vehicle, an over-running clutch including driving and driven members respectively connected to said driving and driven shafts, an automatically actuated clutch including a member adapted to be driven from said driving shaft and a second member adapted to be driven from said driven shaft, reduction gearing for driving said second member of the automatic clutch from said driven shaft, a clutch device driven by said driving shaft, and adapted to transmit a drive from said driving shaft to drive said first member of the automatic clutch, and means for moving said clutch device into position to drivingly connect said driving shaft with said driven member of the over-running clutch, said automatically actuated clutch including means responsive to a predetermined synchronization of the speeds of rotation of said automatic clutch members for drivingly engaging said members when said clutch device is in said first position whereby to overdrive said driven shaft from said driving shaft.

36. In a driving mechanism for a motor vehicle, power driving means, means driven by said driving means and adapted to transmit the drive therefrom to actuate the vehicle, an over-running clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including reduction gearing for driving one of said clutching members at a speed different from that of the other of said clutching members when said driven means is driven from said driving means through said over-running clutch, and manually operated means including a movable clutching device drivingly connected to one of the first two means aforesaid and adapted for movement to establish a driving connection between said driving and driven means whereby to render said over-running clutch ineffective, said clutching device providing a driving connection between one of the first two means aforesaid and one of said plurality of driving means when said clutching device is in at least one of its positions of movement.

37. In a driving mechanism for a motor vehicle, power driving means, means driven by said driving means and adapted to transmit the drive therefrom to actuate the vehicle, an over-running clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said over-running clutch, one of said plurality of driving means including a clutch device adapted for operation to drivingly connect said driving and driven means to provide a direct two-way drive therebetween, and means for manually operating said clutch device.

38. In a driving mechanism for a motor vehicle, power driving means, means driven by said driving means and adapted to transmit the drive therefrom to actuate the vehicle, an over-running clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including reduction gearing for driving one of said clutching members at a speed different from that of the other of said clutching members when said driven means is driven from said driving means through said over-running clutch, and manually operated means including a shiftable clutching structure driven by one of the first two means aforesaid and adapted for selective manual shifting movements, said clutching structure providing a driving connection with one of said clutching members in at least one position of movement thereof and establishing a two-way driving connection with the other of the first two said means in another position of movement thereof.

39. In a driving mechanism for a motor vehicle, power driving means, means driven by said driving means and adapted to transmit the drive therefrom to actuate the vehicle, an over-running clutch including driving and driven members respectively drivingly connected to said driving means and to said driven means, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said over-running clutch, manually operated means including a movable clutching device drivingly connected to one of the first two means aforesaid and adapted for movement to establish a driving connection between said driving and driven means whereby to render said over-running clutch ineffective, said clutching device providing a driving connection between one of the first two means aforesaid and one of said plurality of driving means when said clutching device is in at least one of its positions of movement, means for reversing the normal direction of drive of said driving means, and means actuated in response to said reversing means for moving said clutching device to render said over-running clutch ineffective as aforesaid.

40. In a drive for a motor vehicle having a power driving shaft and a shaft driven therefrom and adapted to drive said vehicle, a speed ratio changing transmission associated with said driving shaft for varying the driving speed thereof and for reversing the direction of drive of said driving shaft, overdriving means between said shafts for driving said driven shaft at a speed greater than the speed of the driving shaft, a speed responsive clutch controlling said overdriving means and including positively engageable clutching structures respectively adapted for driving connection to said driving and driven shafts at least when said structures are clutched, said speed responsive clutch being adapted to automatically connect said shafts through said overdriving means, means drivingly connected to said driving and driven shafts for transmitting a releasable forward direct drive therebetween, a shiftable clutch device normally drivingly connected to one of said shafts and adapted to drivingly connect one of said clutching structures to the last said shaft, and means responsive to reversing the drive of said driving shaft for shifting said clutch device into driving connection with the other of said shafts which is not normally connected to said clutch device whereby to couple said driving and driven shafts for a two-way drive therebetween.

41. In an automotive vehicle, a drive system therefor comprising a drive shaft connected to the engine of the vehicle and a driven shaft operatively associated with the road wheels of the vehicle, selectively operable mechanism associated with said shafts for driving said vehicle either rearwardly or forwardly, said mechanism operable for driving said vehicle forwardly including means operable for providing a normal driving connection between said shafts with automatically operable means operable for driving said driven shaft at a rate faster than that provided by said normal driving means, and means operable when it is desired to drive said vehicle rearwardly for locking out said automatic means.

42. In a drive for a motor vehicle having a power driving shaft and a shaft driven therefrom and adapted to drive the vehicle, said driving and driven shafts being in axial alignment, over-running clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said clutching structures from said driving shaft, means for driving the other of said structures from said driven shaft, one of said driving means including a shiftable clutch device at all times drivingly connecting one of said shafts with one of said clutching structures, at least one of said driving means including a gear train adapted to drive its associated clutching structure at a speed different from that imparted to the other of said structures when said driving shaft drives said driven shaft through said over-running clutch, said over-running clutch being rendered inoperative in response to clutching of said structures, and manually controlled means for shifting said clutch device for locking out said over-running clutch to provide a direct two-way drive between said driving and driven shafts.

43. In a power transmission, a drive shaft, a driven shaft, an over-running clutch including driving and driven members respectively adapted for driving connection to said shafts for transmitting a one-way direct drive therebetween, indirect driving means between said shafts and including a gear train having driving and driven elements adapted for driving connection with said shafts respectively, a centrifugal clutch having clutching structures respectively drivingly connected to said gear train elements for controlling the drive through said indirect driving means, clutch teeth carried by said driven over-running clutch member, a manually shiftable clutch device having teeth adapted for engagement with the teeth of said overrunning clutch driven member, means for continuously driving said clutch device from said driving shaft, means for continuously driving said gear train driving element from said clutch device, and manually operable means for shifting said clutch device to engage the teeth thereof with the clutch teeth of the over-running clutch driven member to provide a two-way direct drive between said shafts.

44. The combination with a driving shaft and a driven shaft, of a gearing for driving the driven shaft at a different speed than that of the driving shaft, a clutch for establishing driving relation between said shafts through said gearing comprising a dog-carrying member having centrifugally operated dogs mounted thereon and means for biasing said dogs in disengaging position until the speed of said member reaches a predetermined point and a dog engaged clutch member, the dogs and the dog engaged member being so related that they will engage when the parts are substantially in synchronism, the dog engaged member being driven when the clutch is disengaged, at a greater speed than the dog carrying member, and shiftable means within the control of the operator connecting one of the members of said clutch to the driving shaft while maintaining the relationship of the gears constant and shiftable to directly connect said driving and driven shafts.

45. In a drive system for an automotive vehicle, the combination of a selectively operable transmission having driving and driven shafts, a propeller shaft operatively connected to the road wheels of said vehicle, an overdrive transmission including vehicle speed responsive control means therefor operatively disposed between said driven shaft and said propeller shaft, said overdrive mechanism being operable for driving said propeller shaft at a rate faster than that of either of said other shafts, said selectively operable transmission mechanism being operable for driving said vehicle forwardly and rearwardly, and means operable incidental to operating said selectively operable transmission for driving said vehicle rearwardly for locking out said overdrive transmission.

46. The combination with a driving shaft and a driven shaft, of a gearing for establishing a drive from the driving shaft to the driven shaft at a different speed than that of the driving shaft, a clutch arranged to automatically establish a two-way drive between said driving and driven shafts through said gearing when the driven shaft reaches a predetermined speed, a one-way clutch for establishing a one to one drive between said driving and driven shafts, a two-way clutch for establishing a one to one drive between said driving and driven shafts independently of said one-way clutch, and means within the control of the operator serving to connect one of the members of the automatic clutch with the driving shaft and adapted for operation selectively between positions for engaging said two-way clutch or for rendering said one-way clutch operable to establish its said one to one drive.

47. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable position driving connection therebetween, means for driving one of said structures from said driving shaft, means for driving the other of said structures from said driven shaft, at least one of said driving means including a gear train adapted to drive its associated clutching structure at a speed different from that imparted to the other of said structures when said driving shaft drives said driven shaft through said overrunning clutch, said overrunning clutch being rendered inoperative in response to clutching of said structures, and manually controlled clutch means operable for locking out said overrunning clutch to provide a direct two-way drive between said driving and driven shafts, said manually controlled clutch means being operably connected to one of said clutching structures such that clutching of said structures locks said manually controlled clutch means against operation to provide said direct two-way drive.

48. The combination with a driving shaft and a driven shaft, of a gearing for driving said driven shaft at a different speed than that of said driving shaft, said gearing including an internal gear, and an automatic clutch for drivingly connecting said internal gear to one of said shafts to establish driving relation between said driving and driven shafts through said gearing, said clutch being so constructed that engagement thereof will not be effected until the two members thereof approach substantial synchronism.

49. The combination with a driving shaft and a driven shaft, of a gearing for driving said driven shaft at a different speed than that of said driving shaft, said gearing including an internal gear, an automatic clutch for drivingly connecting said internal gear to one of said shafts to establish driving relation between said driving and driven shafts through said gearing, said clutch being so constructed that engagement thereof will not be effected until the two members thereof approach substantial synchronism, and releasable clutch means for driving said driven shaft from said driving shaft in a 1:1 ratio prior to engagement of said automatic clutch and for releasing said 1:1 drive to provide relative rotation of said shafts for synchronizing the automatic clutch members, said releasable clutch means including driving and driven clutch elements always drivingly connected with said driving and driven shafts respectively.

50. An overdrive transmission including in combination a power operated driving shaft, a load resisted driven shaft, means including a shiftable clutch member and a one-way clutch operable for affording a direct one-way driving connection between said shafts for driving the driven shaft at the same speed as that of the driving shaft, an automatic clutch having a member operatively connected to each of said shafts respectively and rotatable at relatively different rates at such time as said direct driving connection is provided between said shafts, and means automatically operable for connecting said members of said automatic clutch to provide a driving connection between said shafts and around said direct one-way drive, said means being automatically operable under certain conditions of operation of one of said members.

51. An overdrive transmission including in combination a power operated driving shaft, a load resisted driven shaft, means including a shiftable clutch member and a one-way clutch operable for affording a direct driving connection between said shafts for driving the driven shaft at the same speed as that of the driving shaft, an automatic clutch having a member operatively connected to each of said shafts respectively and rotatable at relatively different rates at such time as said direct driving connection is provided between said shafts, means automatically operable for connecting said members of said automatic clutch to provide a driving connection between said shafts and around said direct drive, said means being automatically operable under certain conditions of operation of one of said members, and means for preventing operation of said automatic means until the rotative speeds of said clutch members are approximately synchronous.

52. A vehicle drive comprising in combination, an engine having a throttle and a throttle-operating device, primary speed ratio changing means including a reverse gear mechanism, a free-wheel clutch for normal drive of the vehicle from the engine through the primary speed ratio changing means and providing a one-way drive for said vehicle, gear mechanism bridging the free-wheel clutch to provide an overdrive speed for the vehicle with the said clutch free-wheeling, automatic means cooperable with said overdrive gear mechanism to produce said overdrive, means normally preventing said cooperation at a relatively low vehicle speed, means dependent upon movement of the throttle actuating device toward throttle-closing position for controlling said automatic means, means for locking said free-wheel clutch on reverse drive of the vehicle, and manually controlled means for disabling said automatic means.

53. A vehicle drive comprising in combination, an engine having a throttle and a throttle-operating device, primary speed ratio changing means including a reverse gear mechanism, a free-wheel clutch for normal drive of the vehicle from the engine through the primary speed ratio changing means and providing a one-way drive for said vehicle, a member shiftable to lock the free-wheel clutch to provide a two-way drive for the vehicle, gear mechanism bridging the free-wheel clutch to provide an overdrive speed for the vehicle with the said clutch free-wheeling, automatic means cooperable with said overdrive gear mechanism to produce said overdrive, means normally preventing said cooperation at a relatively low vehicle speed, means dependent upon movement of the throttle actuating device toward throttle-closing position for controlling said automatic means, means cooperating with the reverse gear mechanism to shift said shiftable member to lock said free-wheel clutch, and manually controlled means for shifting said shiftable member to lock said free-wheel clutch to enable sustained two-way forward drive of the vehicle.

54. A vehicle drive comprising in combination, an engine having a throttle and a throttle-operating device, primary speed ratio changing means including a reverse gear mechanism, a free-wheel clutch for normal drive of the vehicle from the engine through the primary speed ratio changing means and providing a one-way drive for said vehicle, gear mechanism bridging the free-wheel clutch to provide an overdrive speed for the vehicle with the said clutch free-wheeling, automatic means cooperable with said overdrive gear mechanism to produce said overdrive, means normally preventing said cooperation at a relatively low vehicle speed, means dependent upon movement of the throttle actuating device toward throttle-closing position for controlling said automatic means, and means for locking said free-wheel clutch on reverse drive of the vehicle.

55. In an overdrive transmission for a motor vehicle of the type having an engine throttle and an actuating device therefor, a driving shaft adapted to receive drive from the engine, a driven shaft adapted to receive drive from the driving shaft for driving the vehicle, an overrunning clutch for drive of the vehicle from the engine through said shafts, gear mechanism bridging the overrunning clutch to provide an overdrive from the driving shaft to the driven shaft with said clutch overrunning, automatic means cooperable with said overdrive gear mechanism and comprising relatively movable pawl and slotted drive-controlling members positively engageable with each other at or above a predetermined relatively high vehicle speed to produce said overdrive, means preventing said engagement of said drive-controlling members at a relatively low vehicle speed, means dependent upon movement of the throttle-actuating device toward throttle-closing position for controlling said engagement of said drive-controlling members, means operable under manipulative control of the vehicle driver for causing the driving shaft to drive reversely relative to its normal rotation of forward vehicle drive thereby to drive the vehicle in reverse, and means for locking said overrunning clutch on driver manipulation of said reverse drive means.

56. In an automotive vehicle, a drive system therefor comprising a drive shaft adapted to be driven by the engine of the vehicle and a driven shaft operatively associated with road wheels of the vehicle, selectively operable mechanism associated with said shafts for driving said vehicle either forwardly or rearwardly, said mechanism operable for driving the vehicle forwardly including means operable for providing driving connection between said shafts with automatically operable means operable under control of the speed of travel of the vehicle for driving said driven shaft at a rate faster than that provided by the aforesaid driving-connection means, and means operable when it is desired to drive said vehicle rearwardly for locking out said automatic means.

57. In a change speed transmission for a motor vehicle of the type having an engine throttle and an actuating device therefor, a driving shaft adapted to receive drive from the engine, a driven shaft adapted to receive drive from the driving shaft for driving the vehicle, means comprising an overrunning clutch for driving the driven shaft from the driving shaft at a relatively slow driving speed ratio, means providing drive of the driven shaft from the driving shaft at a relatively fast driving speed ratio with said clutch overrunning, automatic means cooperable with said fast driving means and comprising relatively movable drive-controlling means positively engageable with each other at or above a predetermined vehicle speed to produce said fast drive, means preventing said engagement of said drive-controlling members at vehicle speeds below said predetermined speed while accommodating said engagement of said drive controlling members upon movement of the throttle-actuating device toward its throttle-closing position, means operable under manipulative control of the vehicle driver for causing the driving shaft to drive reversely to its normal rotation of forward vehicle drive thereby to drive the vehicle in reverse, and means for locking said overrunning clutch on driver manipulation of said reverse drive means.

GEORGE L. McCAIN.

CERTIFICATE OF CORRECTION.

Patent No. 2,205,486.  June 25, 1940.

GEORGE L. McCAIN.

It is hereby certified that error appears in the printed specification of the above numbered patent requiring correction as follows: Page 9, second column, line 70, claim 20, for the word "engaging" read --engagement--; page 10, second column, line 50, claim 26, for "overlapping" read --overdriving--; page 13, first column, line 63-64, claim 40, for "angageable" read --engageable--; page 14, first column, line 69, claim 47, for "position" read --positive--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.